United States Patent [19]

Dahbura et al.

[11] Patent Number: 4,807,228
[45] Date of Patent: Feb. 21, 1989

[54] METHOD OF SPARE CAPACITY USE FOR FAULT DETECTION IN A MULTIPROCESSOR SYSTEM

[75] Inventors: Anton T. Dahbura, Bedminster; William J. Hery, Mendham; Krishan K. Sabnani, Berkeley Heights, all of N.J.

[73] Assignee: American Telephone and Telegraph Company, AT&T Bell Laboratories, Murray Hill, N.J.

[21] Appl. No.: 27,541

[22] Filed: Mar. 18, 1987

[51] Int. Cl.$^4$ .............................................. G06F 11/20
[52] U.S. Cl. ......................................... 371/9; 371/68; 364/200
[58] Field of Search ...................... 371/9, 11; 364/200

[56] References Cited

U.S. PATENT DOCUMENTS

| | | | |
|---|---|---|---|
| 4,356,546 | 10/1982 | Whiteside et al. | 364/200 |
| 4,358,823 | 11/1982 | McDonald et al. | 364/200 |
| 4,402,045 | 8/1983 | Krol | 364/200 |
| 4,542,455 | 9/1985 | Demeure | 364/200 |
| 4,583,224 | 4/1986 | Ishii et al. | 371/36 |

OTHER PUBLICATIONS

W. R. Moore, "Fault Detection and Correction in Array Computers for Image Processing", *IEEE Proceedings*, vol. 129, Pt. E, No. 6, Nov. 1982, pp. 229–234.

*Primary Examiner*—Charles E. Atkinson
*Attorney, Agent, or Firm*—Jerry W. Herndon

[57] ABSTRACT

A method of detecting and identifying faulty processors in a multiprocessor system. A processing task is assigned when possible to two processors, a primary processor and a secondary processor if a second idle processor is available. In one embodiment, the operations of a secondary processor are preempted and that processor is reassigned as primary for another task if no idle processor is available when the task is initiated. In a second embodiment, the operations of a secondary processor are not preempted, and a new task is queued until an idle processor becomes available. If a secondary processor completes a task, its results are compared with the results of the primary processor. Disagreement messages are broadcast to a central controller in a non-distributed embodiment and to all the processors in the system in a distributed embodiment. The disagreement messages are periodically analyzed by the controller or by each processor. In the distributed embodiment, the analysis algorithm is such that each nonfaulty processor identifies the same subset of faulty processors.

21 Claims, 10 Drawing Sheets

PROCESSOR STATUS TABLE

FAULTY PROCESSOR TABLE

DISAGREEMENT MATRIX M

ERROR MESSAGE

METHOD OF SPARE CAPACITY USE FOR FAULT DETECTION IN A MULTIPROCESSOR SYSTEM

FIELD OF THE INVENTION

The invention relates to the use of spare processor capacity in a multiprocessor system to detect faulty processors and, further, to a method whereby nonfaulty processors in the system are able to identify the faulty processors.

BACKGROUND OF THE INVENTION

Methods for detecting and diagnosing faults have been employed since the fist generations of computers, although primarily in the form of dedicated redundancy. An example of this is the early stored program controlled switching machines used in the telephone industry in which all major components, including peripherals, memory, and processors are duplicated. The processors in these execute the same tasks in synchronism and continually compare output results to detect failures when they occur. When the outputs of the processors differ, complex testing routines are immediately called into operation to identify the faulty processor.

Later systems have employed triple and greater redundancy in conjunction with majority voting schemes to both detect faults and identify faulty components at the same time. U.S. Pat. No. 4,583,224, entitled FAULT TOLERABLE REDUNDANCY CONTROL, issued to Gotoh Yoshimi et al., is illustrative of this type of system.

The capabilities and speed of processing components are increasing dramatically as their size and cost decrease. These rapid advances, along with the ever-growing need for faster computations, have led to the advent of multiprocessor systems consisting of large numbers of processing elements. The multiprocessors of these systems collectively are able to perform sophisticated tasks at accelerated rates. The growing complexity of multiprocessor systems and their vital applications make the ability to detect and diagnose faults a critical issue. The dedicated redundancy fault detection techniques of the past are clearly inadequate and too expensive for use in present multiprocessor systems.

A general summary of the art of fault-tolerant computing in multiprocessor systems is given in FAULT DETECTION AND CORRECTION IN ARRAY COMPUTERS FOR IMAGE PROCESSING, W. R. Moore, *IEEE Proceedings*, Vol. 129, No. 6, November 1982. One detailed approach to the above problem is disclosed in U.S. Pat. No. 4,356,546, entitled FAULT-TOLERANT MULTI-COMPUTER SYSTEM, issued to Freedman et al. In this teaching, each task to be executed is assigned to more than the one processor of the system. In relevant part, it appears that each processor executing a task reports its results to all other processors of the system; if at least three processors execute the same task, majority voting is used, among other techniques, to detect faulty processors. It is not entirely clear what is done if and when only two processors execute the same task. Thus, it is seen that this technique requires the use of multiple processors for every system task. While useful and effective, this technique therefore reduces the overall capacity of the system as a whole.

SUMMARY OF THE INVENTION

The above-summarized problems of the prior art are overcome in a method of detecting faults in a multiprocessor system. In response to an initiation of a computing task, the system ascertains if one or more of the processors are idle. If so, the task is assigned to a primary idle one of the processors. The system then assigns the same task to a secondary idle one of the processors is another idle processor is available. If a secondary processor is assigned to the task, the task output results, or representation thereof, of the primary and secondary processors are compared when both processors have completed the task. If the results disagree, an indication is set in a disagreement table that the primary and secondary processors disagree. At periodic times, the disagreement table is analyzed according to a predetermined algorithm to determine faulty ones of the processors on a probabilistic basis.

In a nonpreemptive embodiment, a task is queued for later service if no processors are idle when the task is initiated. In a preemptive embodiment, if no processors are idle, the system determines if any processor is assigned as a secondary processor for any other task. If this is the case, the processing operations of a secondary processor are terminated, and that secondary processor is assigned as a primary processor for the instant task. Thus, in the preemptive embodiment, in some cases, secondary tasks are not started; in other cases, secondary tasks are started but later preempted; and, in still other cases, secondary tasks proceed to completion. In either the preemptive or nonpreemptive embodiments, it can be shown that a sufficient number of secondary processes can be completed in a reasonably loaded system to provide a basis for fault detection and diagnosis.

DETAILED DESCRIPTION

Figure 1:
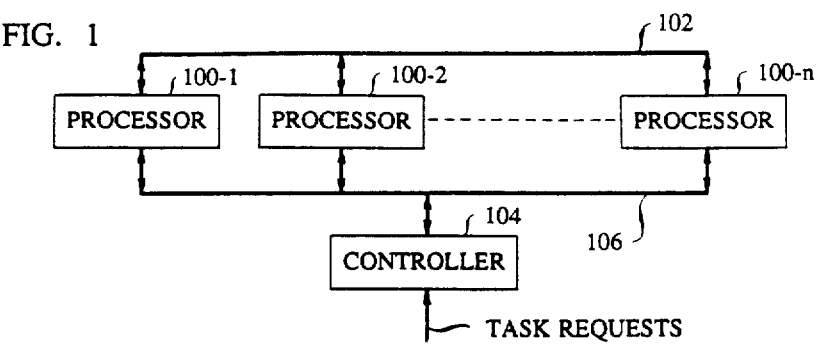
FIG. 1 is a summary block diagram of an illustrative multiprocessor system, including a central controller for task scheduling, fault analysis and identification, which may be used for practicing the invention.

The illustrative system of FIG. 1 consists of identical processors 100-1 through 100-N interconnected via a bus 102. A central controller 104 communicates with the processors via bus 106 and, among other things, schedules tasks for each processor.

Figure 2:
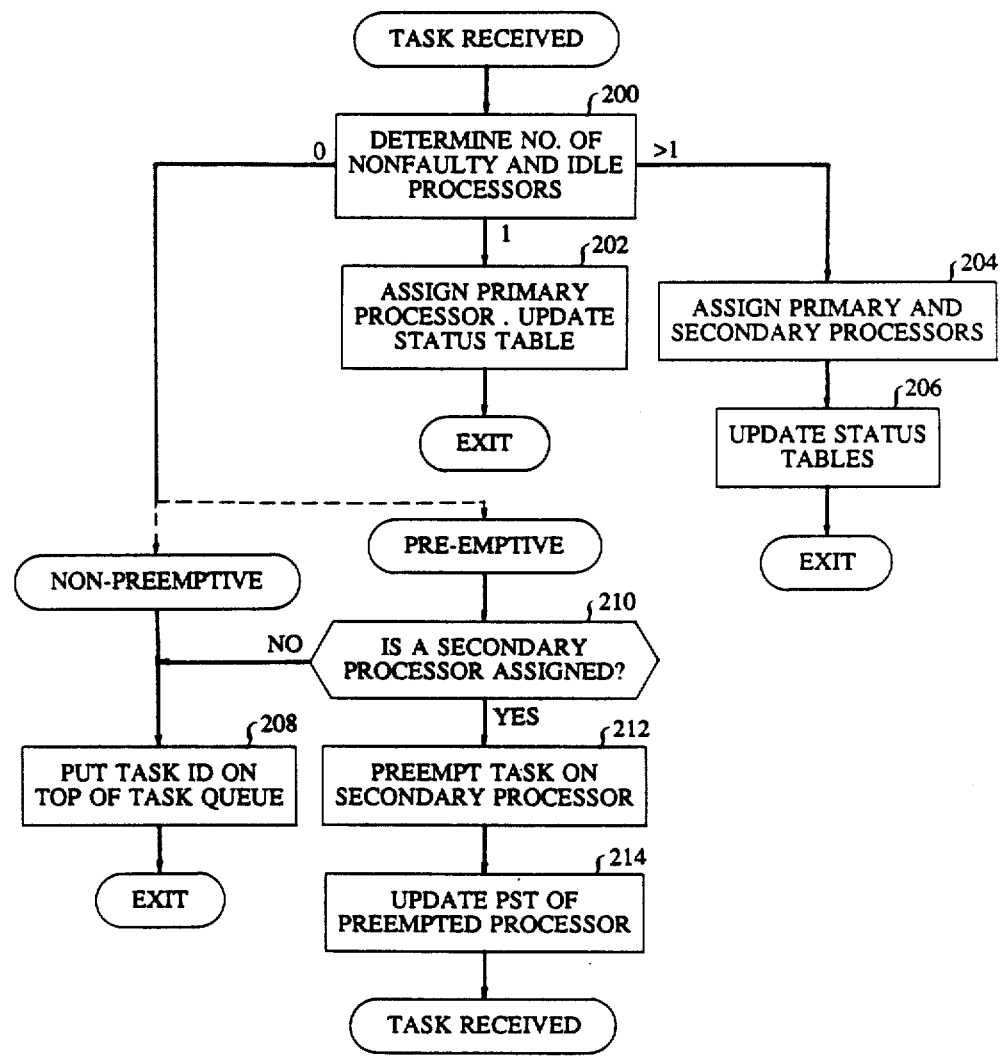
FIGS. 2-9 are flowcharts of an illustrative algorithm for teaching the invention herein in two illustrative embodiments, one in which the central controller of FIG. 1 performs all task scheduling, processor task assignments and fault diagnosis and one in which the fault diagnosis is performed on a distributed basis by the processors themselves.
Figure 10:
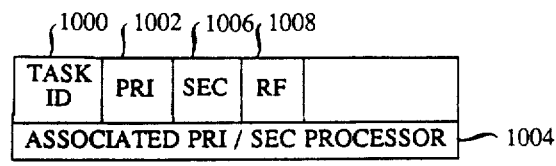
FIGS. 10-14 show illustrative data storage formats for the above-mentioned flowcharts.
Figure 11:
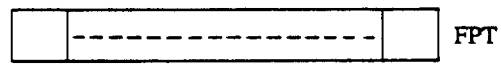

The invention is described first with reference to FIG. 2, which shows the flowchart of a program that is executed by controller 104. In response to the arrival of a task, step 200 determines the number of nonfaulty and idle processors presently in the system. It does this by examining illustrative processor status tables PST shown in FIG. 10 and an illustrative faulty processor table FPT, shown in FIG. 11. Referring to FIG. 10, a processor status table (PST) exists for each processor in the system. When a task is assigned to a primary processor, a task identification is placed in 1000 of the PST for this processor and a primary (PRI) flag 1002 is set. If another processor is assigned as secondary for the instant task, the number of that secondary processor is placed in 1004 of the primary processor PST. Similarly, if a secondary processor is assigned, the task identification is set in the PST for that processor, the secondary (SEC) flag 1006 is set and the primary processor number is placed in 1004 of the secondary PST. Referring to FIG. 11, each individual bit of the faulty processor table (FPT) is associated with the processor having the associated bit number and the state of each bit defines whether the processor is considered to be operable or faulty. The FPT table resides in controller 104 in a nondistributed embodiment. In this embodiment, central controller 104 performs all task scheduling, processors task assignments and fault diagnosis. Individual FPT's reside in each individual processor 100 in the distributed embodiment. Processor fault diagnosis is performed on a distributed basis by the processors themselves in this embodiment. In the nondistributed case, the processors send error messages to the controller 104 for updating of the PFT. In the distributed case, each processor 100 broadcasts error messages to each of the other processors to cause updating of the individual FPT's in a manner to be described.

Figure 12:
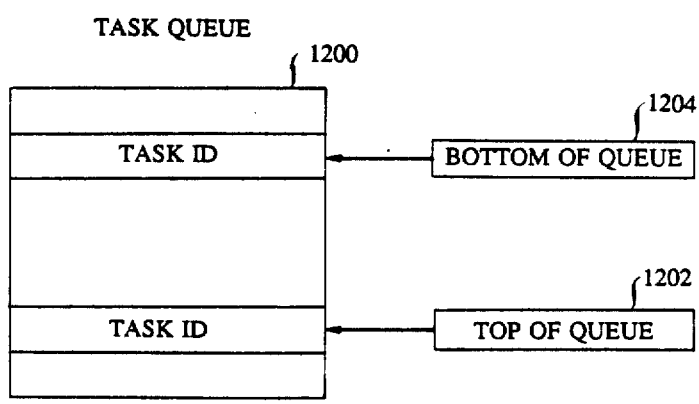

Referring again to FIG. 2, if step 200 finds only one idle nonfaulty processor, a primary version of the arriving task is immediately assigned to that processor by step 202 and the PST is updated as above discussed. If step 200 finds more than one idle nonfaulty processor 10, then step 204 assigns a primary and a secondary version of the task to primary and secondary ones of the idle processors and the associated PST's are updated at step 206. Therefore, there must be at least two idle processors present in the system for an arriving task to have both primary and secondary versions. If only one idle processor is available, the secondary task is not performed. FIG. 2 shows two alternative strategies, identified by the labels NONPREEMPTIVE and PREEMPTIVE, if no idle processor is available when a task is initiated. That the strategies are alternative is indicated by the dashed connecting lines to NONPREEMPTIVE and PREEMPTIVE in FIG. 2. The simplest alternative is the nonpreemptive strategy. In this strategy, step 208 places a task identifier on top of a task queue for later processing. An illustrative task queue 1200 is shown in FIG. 12. A memory word 1202 points to the present top of the queue. Similarly, another memory word 1204 points to the bottom of the task queue. Task queue entries between the top and bottom locations contain identifications of tasks waiting to be served. The appropriate pointer 1202 or 1204 is updated as the task identifiers are added to and removed from the queue.

In the alternative preemptive embodiment, step 210 examines a processor status table PST to determine if a secondary task is presently assigned to one of the processors 100. If the answer is no, the task is queued by step 108 as previously discussed. However, if one or more of processors 100 is executing a secondary task, step 212 preempts the secondary task on an arbitrarily selected one of the secondary processors. Preemption may be done in any number of ways. In the present teaching, controller 104 generates and transmits a preempt message to the processor whose task is to be preempted. In appropriate systems, an interrupt mechanism requiring individual interrupt leads to each processor could also be used. In any event, after preemption is accomplished, step 214 updates the PST of the preempted processor to reflect its idle status. Step 200 is again executed and, this time, it is guaranteed to find an idle processor which is assigned as primary for the task by step 202.

When a task is completed by a processor 100, the processor sends the results or a compressed representation of the results (or a task complete message) to controller 104. The message also identifies the reporting processor. One thing that happens in response to such a message is an entry to a procedure TASK COMPLETED in FIG. 3 Step 300 first sets a result flag RF (1008) in the PST of the reporting processor to indicate that the associated task is completed. Step 301 updates the PST of the reporting processor to reflect that it is now idle. In the distributed embodiment, since there now exists at least one idle processor, step 304 determines if there is any entry awaiting service in the task queue. If so, step 306 fetches the oldest entry in the queue and returns it to program TASK RECEIVED in FIG. 2 for assignment. For the nondistributed embodiment, TASK COMPLETED must collect and compare results from both primary and secondary processors, if both exist for a task. Therefore, step 302 determines from 1004 of the PST if a secondary processor has been assigned to this task. If not, steps 304 and 306 are executed as described above. If it is determined that a secondary task has been assigned, step 308 determines from the RF flags (1008) of the primary and secondary PST's if both the primary and secondary results have now been received by controller 104. If not, the program exits and waits for the arrival of the remaining result message (which would cause a reentry to TASK COMPLETED). There is a timeout procedure associated with this action to protect against the possibility that the result never arrives. This is not shown for simplicity.

Figure 4:
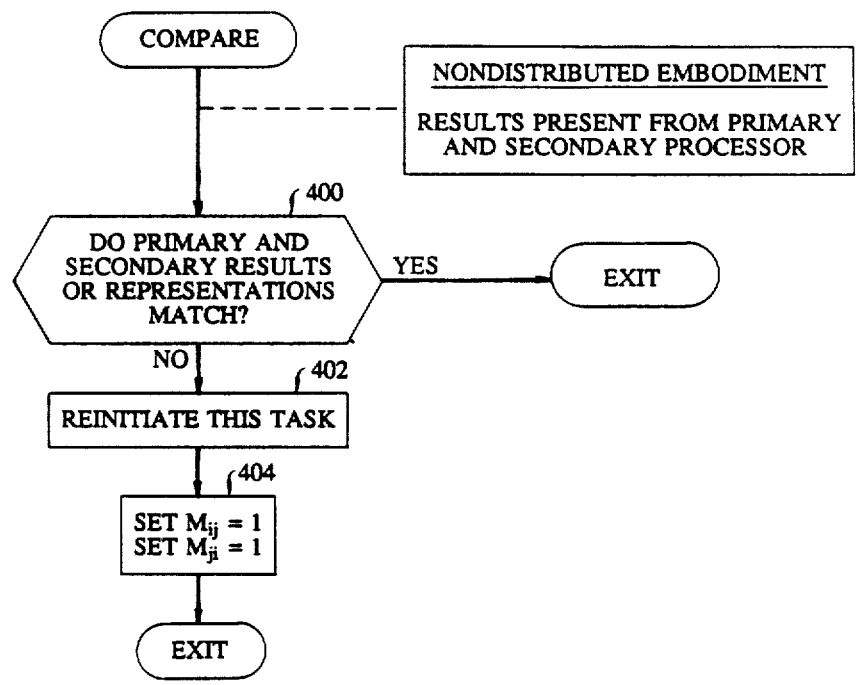
Figure 13:
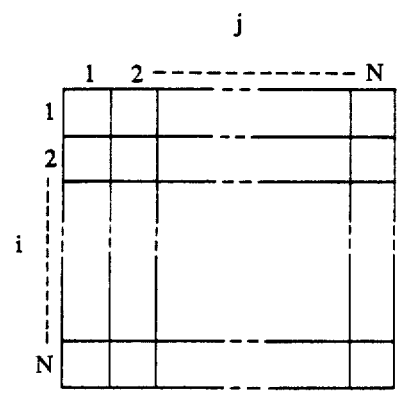

When both results are present in the nondistributed embodiment, step 308 enters the procedure COMPARE in FIG. 4. Step 400 compares the results or the compressed result representations from the primary and secondary processors and exits if the results match. However, if the results mismatch, one or both of the associated processors has made an error. It is not known at this time which of the primary and secondary results is valid, or if either is valid. Therefore, step 402 reinitiates this task for a subsequent entry to procedure TASK RECEIVED, so the task will be reprocessed and new results obtained. Next, step 404 updates a fault matrix M maintained by controller 104 in the nondistributed embodiment. An illustrative fault matrix M is shown in FIG. 13. Assuming that the two reporting processors are identified as i and j, and that i and j correspond to the rows and columns, respectively, of M, step 404 sets both the matrix bits $m_{ij}$ and $m_{ji}$. This indicates in the matrix that, at some point in time, processor i disagreed with processor j, and that processor j disagreed with processor i.

In the distributed embodiment, each processor maintains its own individual fault matrix M. The method of administering these individual fault matrices is discussed in detail below.

Figure 5:
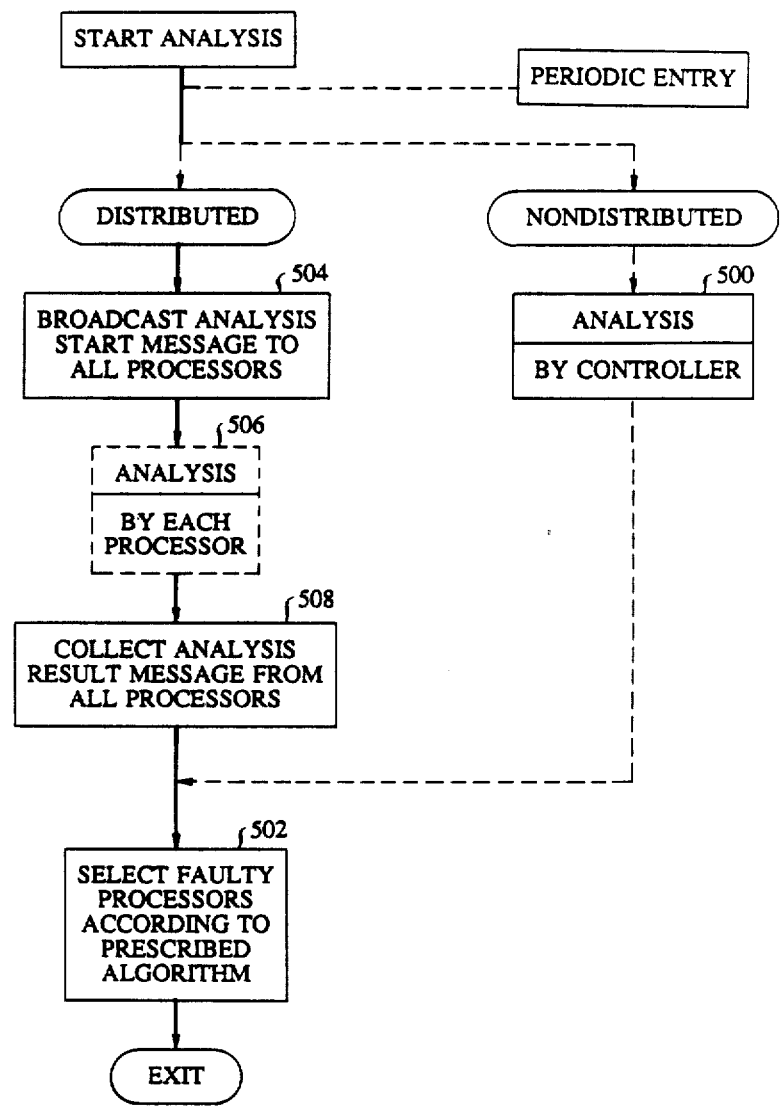

The procedure START ANALYSIS in FIG. 5 is executed periodically by controller 104 when a sufficient number of tasks has been processed by the system to make meaningful probabilistic decisions about the fault states of the system processors. A variety of criteria may be used by controller 104 to decide when START ANALYSIS should be executed. One simple and reliable criterion is to perform analysis each time a fixed number of tasks has been performed by the system. This is the criterion assumed here. Another simple, but perhaps less reliable, criterion could be based on the passage of prescribed intervals of time. In the nondistributed embodiment, START ANALYSIS, at step 500, runs a procedure ANALYSIS. ANALYSIS processes the data in the fault matrix M and returns the results of analysis to START ANALYSIS. Faulty processors are identified from the results at step 502 in accordance with a predefined algorithm, an illustrative one of which is subsequently described.

In the distributed embodiment, the function of START ANALYSIS is to initiate analysis of the individual fault matrices in the individual processors. Accordingly, step 504 broadcasts an analysis start message on bus 106 to all the system processors. As a result, the ANALYSIS procedure, which is present in each of the system processors in this embodiment, is executed in each of the system processors. This is conceptually illustrated by the dashed box 506 in FIG. 5. As each processor completes the analysis procedure, it transmits a result message to controller 104 where they are collected as indicated at step 508. When all result messages are returned, step 502 again selects the faulty processors. Task assignments are subsequently allocated based on these results, as we have priorly discussed.

Figure 6:
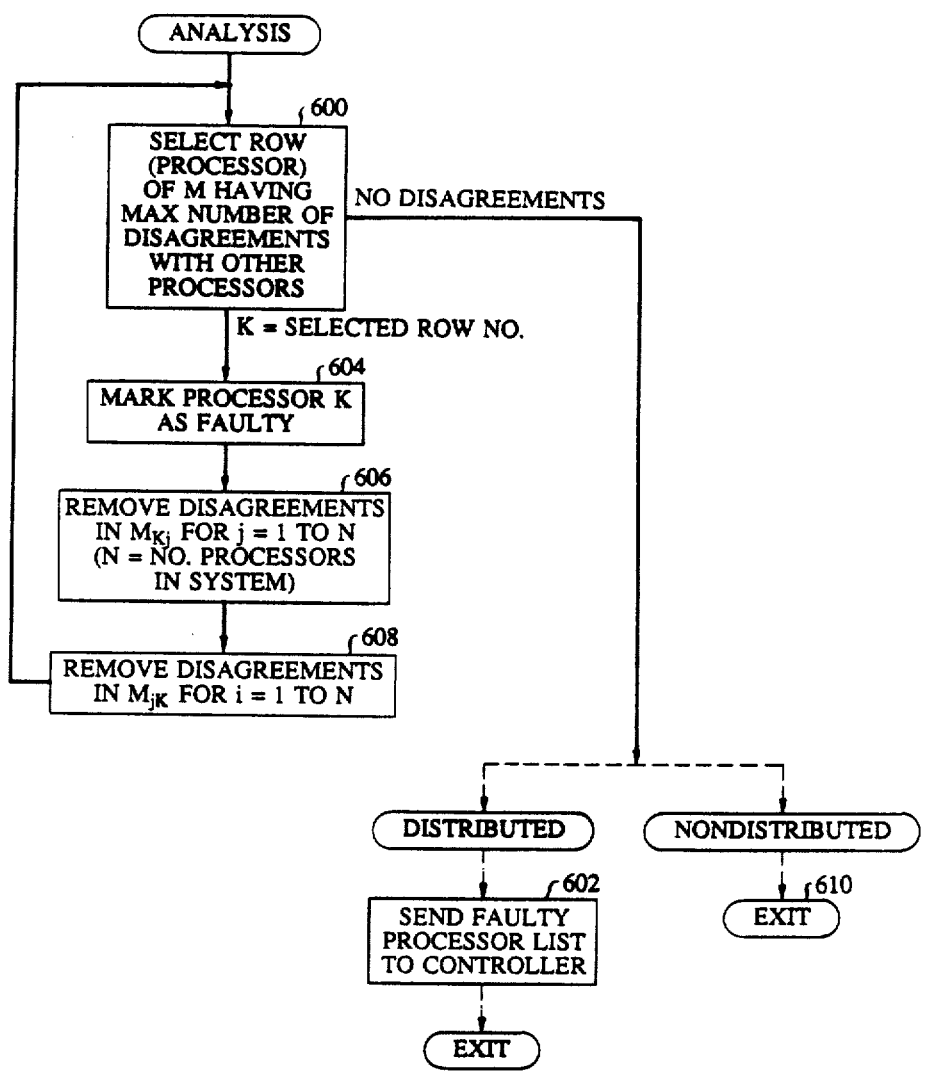

The ANALYSIS procedure that is executed by controller 104 in the nondistributed embodiment or by the individual processors in the distributed embodiment, is shown in FIG. 6. Recall that each '1' in the fault matrix represents at least one disagreement between two processors i and j. Each '1' may be viewed as a connecting edge in the matrix between the two processors. The analysis algorithm operates by removing all edges in the matrix, starting with the processor having the largest number of edges, and so on, marking each processor associated with an edge faulty as it proceeds, until no edges remain in the matrix. Thus, with reference to FIGS. 6 and 13, step 600 examines the rows of the fault matrix M and selects the row (i) having the largest number of 1's. The row (i) corresponds to a deemed faulty processor K. If there is no such row, no processors are deemed faulty. In the distributed embodiment for this case, step 602 sends a null faulty processor list to controller 104.

In the event that there are disagreements in matrix M, and that more than one row has the same number of 1's, any one of these may be selected arbitrarily. The processor K associated with the selected row is marked faulty at step 604. Steps 606 and 608 remove the matrix edges associated with K by zeroing the matrix bits $M_{Kj}$ and $M_{iK}$ for i and j varying from 1 to N where N equals the number of processors in the system. These steps are then repeated until no disagreement edges remain in matrix M. The list of deemed faulty processors is then sent to controller 104 at step 602 in the distributed embodiment, or the ANALYSIS program is ended at 610 in the nondistributed embodiment. In the latter case, since controller 104 executed the ANALYSIS procedure, the resulting deemed faulty processor list is now accessible by controller 104.

Figure 3:
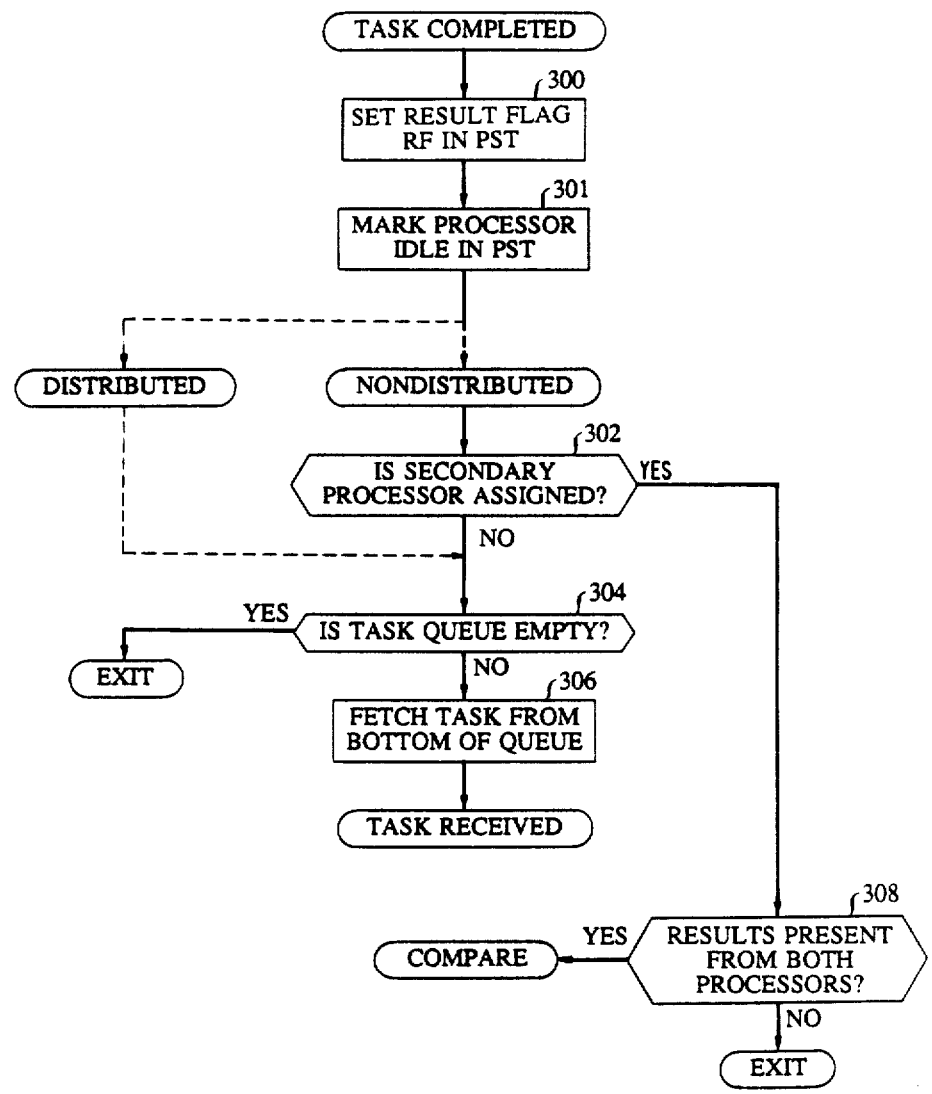
Figure 14:
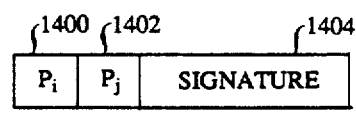

It is recalled that, in the nondistributed embodiment, controller 104 compares the results from primary and secondary processors to generate the fault matrix M. In the distributed embodiment, each processor sends a result message to an associated (primary or secondary) processor, if one exists, when it has completed a task. The message contains the results of performing the task or a condensed representation of the results. A processor receiving such a message compares the result or result representation to that of its own result, in a fashion similar to the way controller 104 compares results in the nondistributed embodiment as shown in FIGS. 3 and 4. If a processor determines that a result or representation disagrees with its own, it broadcasts a disagreement message to all other processors in the system. An illustrative disagreement message format is shown in FIG. 14. Each message contains an identification $P_i$(field 1400) of the processor sending the message, an identification $P_j$(field 1402) of the processor with which $P_i$ disagrees and a signature of the $P_i$ in field 1404. The signature is unique for each system processor and is redundantly encoded in any desired manner such that errors and faults are highly unlikely to create valid but spurious processor signatures.

Figure 7:
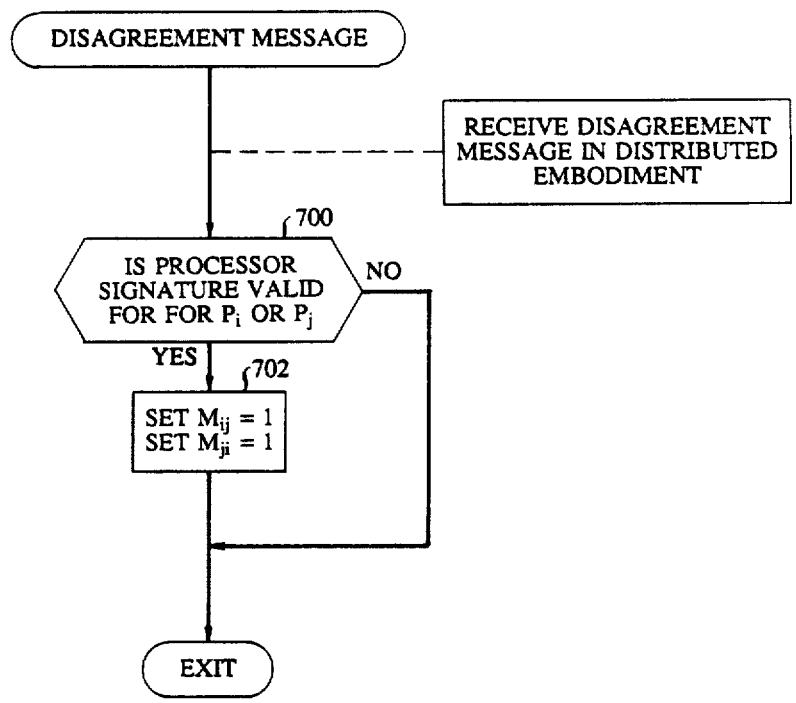

FIG. 7 shows illustrative steps that are performed by the individual processors in response to receiving a disagreement message in the distributed embodiment. Step 700 decodes the signature and determines if it is valid for either $P_i$ or $P_j$. If it is invalid, the disagreement message is ignored. Otherwise, step 702 sets bits $m_{ij}$ and $m_{ji}$ in the individual processor fault matrix M.

Figure 8:
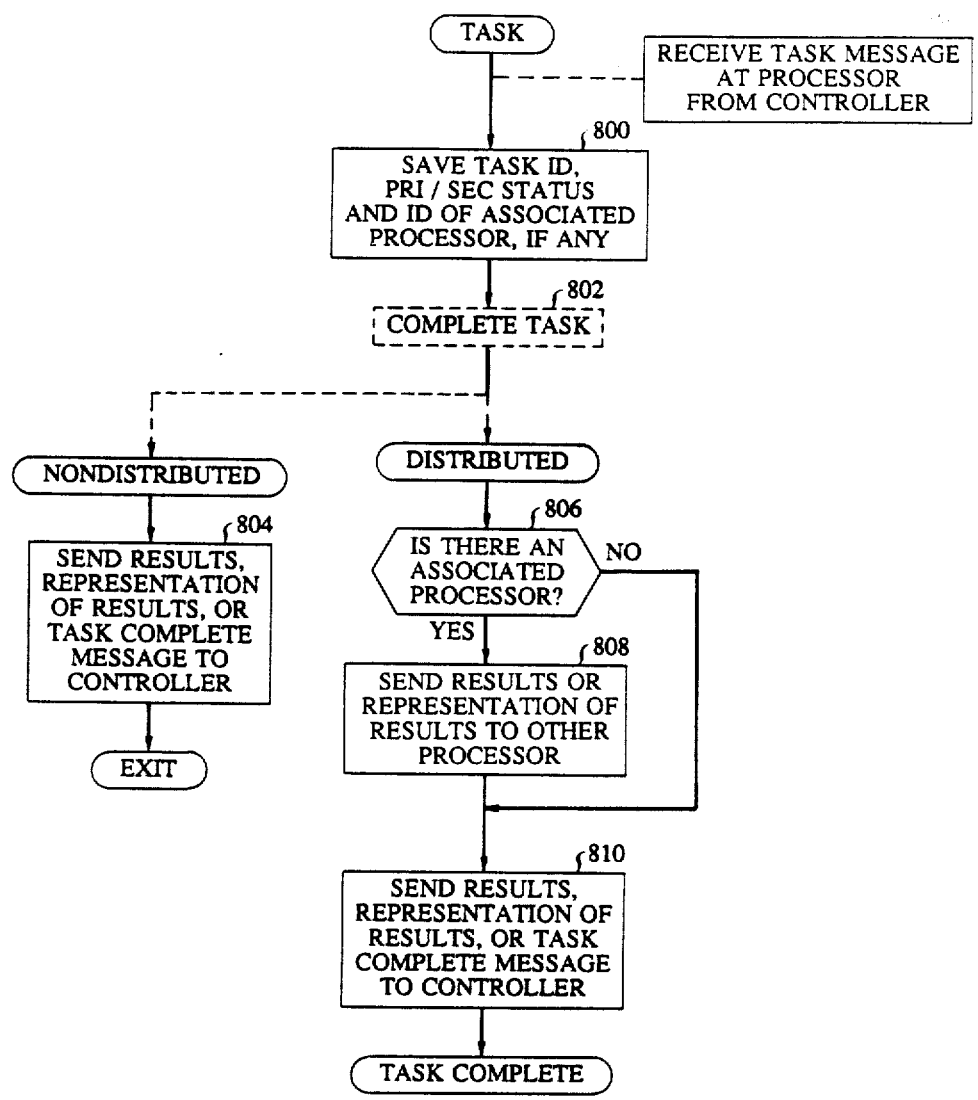
Figure 9:
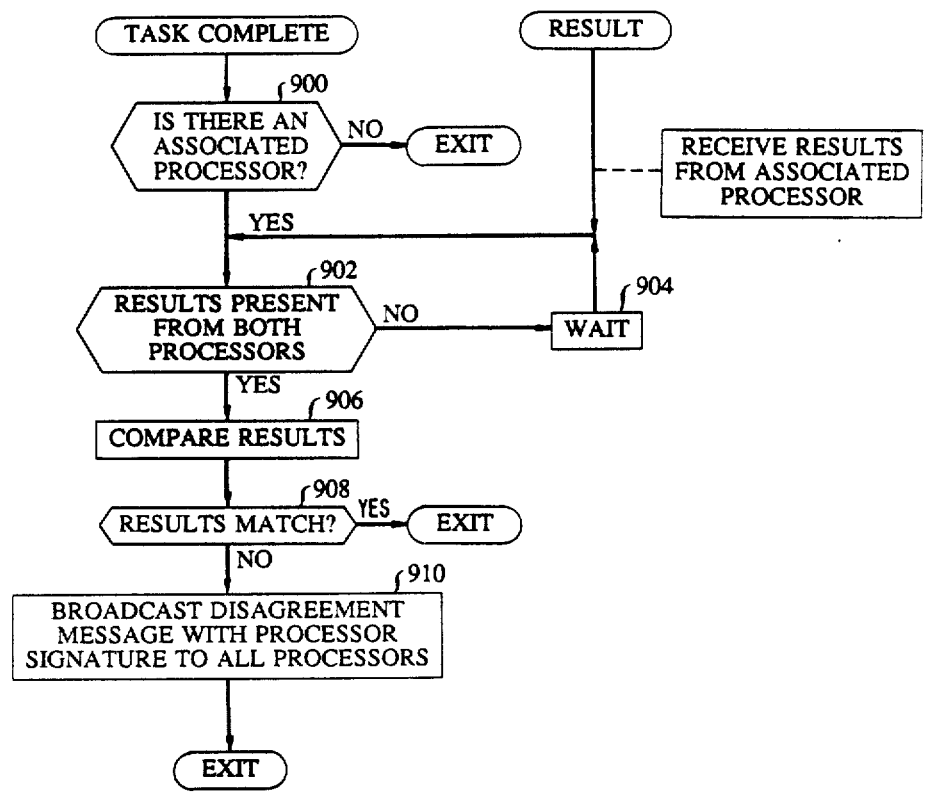

FIG. 8 shows illustrative steps that are performed at a processor when a task assignment message is received from controller 104. A task message contains an identification of the task to be performed by the processor and an indication of whether the processor is assigned as primary or secondary. Step 800 saves this information for later use. The task is performed, as conceptually illustrated by dashed box 802. When it is completed, in the nondistributed embodiment, step 804 sends the results, a result representation or a task complete message, depending on the task, to controller 104 where it is processed as above described. In the distributed embodiment, step 806 determines from the earlier stored information if there is an associated processor (primary or secondary) for this task. If so, step 808 sends the results or a representation of the results to the associated processor so that a determination as to disagreement can be made. In either event, the results, a representation or a task complete message is sent to controller 104, depending on the task. Entry is then made to a TASK COMPLETE program, shown in FIG. 9.

Step 900 of TASK COMPLETE again determines if an associated processor is assigned to this task. If not, the program exits. Otherwise, step 902 determines if the results have been received from the other associated processor. Step 902 is also the beginning step for a program RESULT, also shown in FIG. 9. An entry is made to RESULT when a result message is received at a processor from an associated processor. If step 902 determines that the results have not arrived from an associated processor, a suitable form of wait mechanism is initiated as represented by step 904 until the results arrive. At this time, step 906 compares the results of the two processors. If the results match, no eror or fault is indicated, and program execution is ended by step 908. If the results mismatch, indicating a probable fault in one of the processors, step 910 generates a disagreement message, as discussed with respect to FIG. 14 and broadcasts it to all the system processors.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. A method of detecting faults in a multiprocessor system in which processing tasks are executed by plural ones of the processors and the results from each of the processors compared, CHARACTERIZED BY the steps of ascertaining if one or more of the processors are idle response to an initiation of a computing task and, if so, assigning the task to a primary idle one of the processors if an idle processor is available, assigning the task to a secondary processor if a second idle processor is available, if a secondary processor is assigned, comparing the task results of the primary and secondary processors, setting an indication in a disagreement table that the primary and secondary processors disagree if the task results of the primary and secondary processors do not compare, and periodically analyzing indications in the disagreement table according to a predetermined algorithm to determine faulty ones of the processors.

2. The method of claim 1 further CHARACTERIZED BY the step of determining if any processor is assigned as a secondary processor for any other task if no processor is idle at the ascertaining step and, if so, preempting the processing operations of a secondary processor and assigning the preempted processor as a primary processor for the instant task.

3. The method of claim 1 wherein the system further comprises a central controller for performing the steps of the method.

4. The method of claim 1 wherein the steps of result comparing and periodic analyzing are performed by the individual processors.

5. The method of claim 3 further CHARACTERIZED IN THAT each processor transmits a result message to the central controller when the processor has completed a task.

6. The method of claim 5 further CHARACTERIZED IN THAT, in response to receipt of a first result message from a processor, the central controller ascertains if a second processor is assigned to perform the task associated with the first result message and, if so, waits to receive a result message from the second processor.

7. The method of claim 6 further CHARACTERIZED IN THAT the controller compares the first and second result messages and, in the event the messages do not compare, sets a first indication in the disagreement table that the first processor disagrees with the second processor, and sets a second indication in the disagreement table that the second processor disagrees with the first processor.

8. The method of claim 7 further CHARACTERIZED IN THAT the central controller reinitiates task processing operations if the first and second result messages do not compare.

9. The method of claim 7 wherein the step of periodically analyzing the disagreement table is further CHARACTERIZED BY marking as faulty each of two processors associated with each indication in the disagreement table.

10. The method of claim 4 further CHARACTERIZED IN THAT an individual disagreement table is maintained by each processor.

11. The method of claim 10 further CHARACTERIZED IN THAT when a processor has completed a task, it ascertains if a second processor is assigned to perform the same task and, if so, transmits a result message to the second processor.

12. The method of claim 11 further CHARACTERIZED IN THAT, in the event a second processor is assigned to perform the task, the first processor waits until a result message is received from the second processor, compares its results with that of the second processor and, if the results do not compare, sets a first indication in its disagreement table that it disagrees with the second processor, and sets a second indication in its disagreement table that the second processor disagrees with it.

13. The method of claim 12 further CHARACTERIZED IN THAT each processor disagreeing with another processor transmits a disagreement message to all processors identifying the disagreeing processors.

14. The method of claim 13 further CHARACTERIZED IN THAT the disagreement message contains an encoded identification of the processor transmitting the disagreement message.

15. The method of claim 14 further CHARACTERIZED IN THAT a processor receiving a disagreement message verifies that the encoded identification of the processor transmitting the disagreement message matches the identify of one of the disagreeing processors contained in the message.

16. The method of claim 15 further CHARACTERIZED IN THAT a processor receiving a disagreement message ignores the message if the encoded identification of the processor transmitting the disagreement message does not match the identity of one of the disagreeing processors contained in the message.

17. The method of claim 16 further CHARACTERIZED IN THAT a processor receiving a disagreement message sets a first indication in its disagreement table that a first processor identified in the disagreement message disagrees with a second processor identified in the message and sets a second indication in its disagreement table that the second processor disagrees with the first processor.

18. The method of claim 17 wherein the step of periodically analyzing a disagreement table is further CHARACTERIZED BY each processor analyzing its individual disagreement table and marking as faulty each of two processors associated with each fault indication in the disagreement table.

19. The method of claim 18 further CHARACTERIZED IN THAT the system comprises a central controller for administering task assignments of the individual processors and IN THAT the step of each processor analyzing its disagreement table is initiated by a start analysis message received from the central controller.

20. The method of claim 19 further CHARACTERIZED IN THAT each processor transmits a list of faulty processors to the central controller after the fault analysis.

21. The method of claim 20 further CHARACTERIZED IN THAT the central controller marks as faulty for task assignments purposes the set of processors common to all of the fault lists from the processors.

* * * * *